United States Patent [19]

Morris et al.

[11] Patent Number: 4,667,263

[45] Date of Patent: May 19, 1987

[54] GROUND FAULT MODULE FOR GROUND FAULT CIRCUIT BREAKER

[75] Inventors: Robert A. Morris, Burlington; Paul T. Rajotte, Plainville, both of Conn.

[73] Assignee: General Electric Company, New York, N.Y.

[21] Appl. No.: 725,611

[22] Filed: Apr. 22, 1985

[51] Int. Cl.$^4$ .............................................. H02H 3/347

[52] U.S. Cl. ........................................ 361/42; 361/45; 335/18

[58] Field of Search ................ 335/18; 361/42, 44–49, 361/356, 357

[56] References Cited

U.S. PATENT DOCUMENTS

| | | | |
|---|---|---|---|
| 4,010,432 | 3/1977 | Klein et al. | 335/18 |
| 4,263,637 | 4/1981 | Draper et al. | 361/45 |
| 4,412,193 | 10/1983 | Biewald et al. | 361/42 X |
| 4,521,824 | 6/1985 | Morris et al. | 335/18 X |
| 4,574,260 | 3/1986 | Franks | 335/18 |
| 4,578,732 | 3/1986 | Draper et al. | 335/18 X |
| 4,595,894 | 6/1986 | Doyle et al. | 361/42 X |

*Primary Examiner*—A. D. Pellinen
*Assistant Examiner*—A. Jonathan Wysocki
*Attorney, Agent, or Firm*—Richard A. Menelly; Walter C. Bernkopf; Fred Jacob

[57] ABSTRACT

A ground fault module is designed for ease of assembly within a ground fault circuit breaker. The module houses the pre-assembled signal processor module, which contains the ground fault circuit interruption logic, along with the mechanical components required for translating the trip initiating response from the signal processor solenoid to the circuit breaker operating mechanism. The ground fault test button and related circuitry are also supported within the ground fault module.

14 Claims, 3 Drawing Figures

GROUND FAULT MODULE FOR GROUND FAULT CIRCUIT BREAKER

BACKGROUND OF THE INVENTION

A signal processor module for an automated ground fault circuit breaker, described within U.S. patent application Ser. No. 725,610 entitled "Signal Processor Module For Ground Fault Circuit Breaker" in the names of Robert A. Morris et al., and filed concurrently with the instant Application, describes the arrangement of the differential current transformer, neutral excitation transformer, signal processor circuit and trip initiating solenoid supported upon the signal processor printed circuit board. The individual components are automatically assembled to provide a unitary signal processor module for independent test and calibration prior to insertion within the ground fault module which is the subject of the instant invention. Once the signal processor module and the ground fault module are assembled together and are calibrated and tested, the combined modular subassembly is then arranged within the circuit breaker module to provide a completely operational ground fault circuit breaker having ground fault, short circuit, and overcurrent protection.

As described within the aforementioned U.S. Patent Application, earlier ground fault circuit breaker designs were not capable of automated assembly. However, it has since been determined that by providing separate functional modules such as the signal processor module, ground fault module and circuit breaker module which are individually pre-assembled on automated equipment, the component modules can then be assembled together to form the complete ground fault circuit breaker in a downloaded operation.

SUMMARY OF THE INVENTION

A ground fault module for use within a ground fault circuit breaker is provided by the arrangement of a signal processor module, which contains the ground fault logic, within a molded case compartment having means for receiving the mechanical components required for translating trip initiating motion from the signal processor trip solenoid to the circuit breaker operating mechanism. Also supported within the ground fault module are the ground fault test button, the test spring anchor along with the neutral terminal lug.

DESCRIPTION OF THE PREFERRED EMBODIMENT

Figure 1:
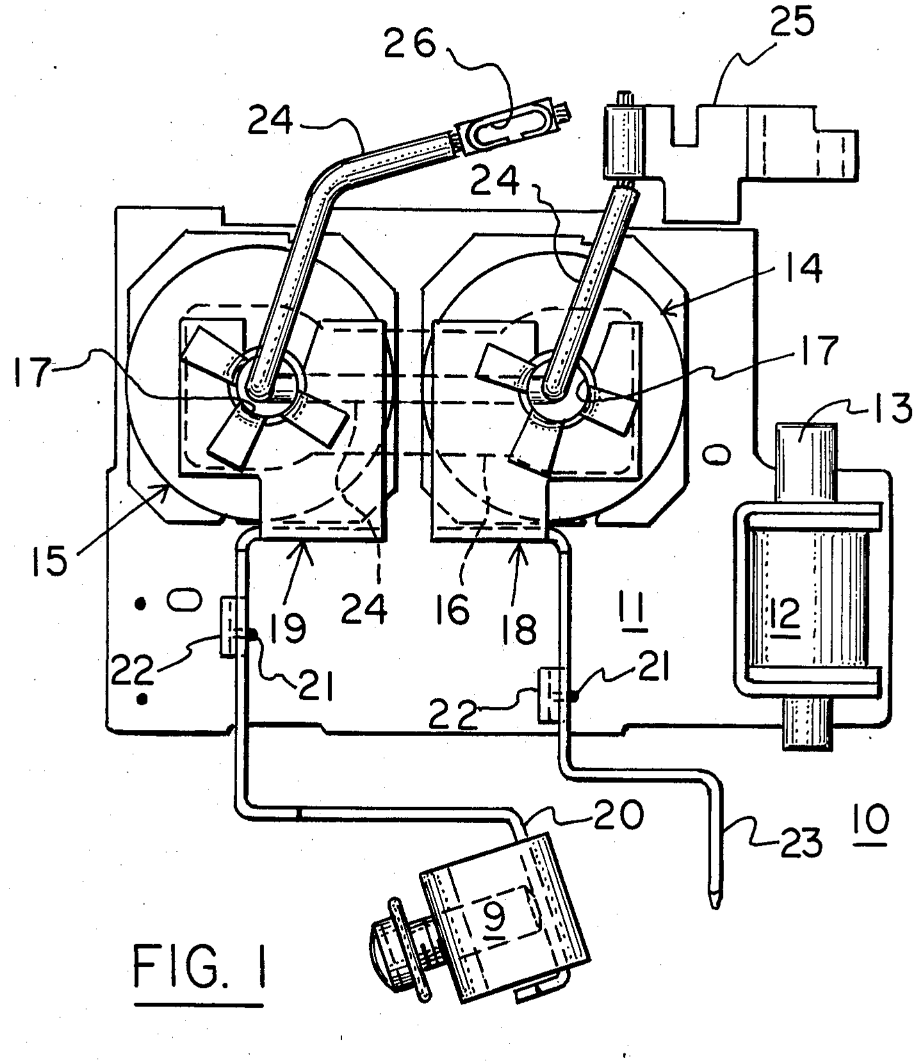
FIG. 1 is a plan view of the signal processor module subassembly.

The signal processor module 10 shown in FIG. 1 includes a printed circuit board 11 which contains the electronic circuitry for providing the ground fault interruption logic. Also mounted on the circuit board is the trip solenoid 12 which includes a plunger 13 responsive to trip signals emanating from the signal processor circuit. The neutral excitation transformer 14 is electrically connected with the signal processor circuit along with the differential current transformer 15 as described within the aforementioned Patent Application to R. A. Morris et al. Both transformers are interconnected by means of a connecting strap 16 for providing a first electric current transport path through the transformer apertures in combination with the tubular conductors 17 arranged concentrically therein. A second electric current transport path is provided by means of an insulated conductor 24 terminating at its ends by means of a line stab 25 and a flag type spade connector 26. The insulation on the conductor insures that the first and second electrically conducting paths are maintained electrically isolated. Connection is made with the tubular conductor 17 within the differential current transformer 15 by means of a neutral strap load connector 19 arranged for electrical connection with the external circuit by means of the angled terminal end 20 and terminal lug 9. Electrical connection between the neutral strap load connector and the printed circuit board is made by means of a connecting pin 21 extending through the printed circuit board and captured within a lanced aperture 22 formed within the neutral strap load connector. A similar neutral strap line connector 18 is connected with a tubular conductor 17 within the neutral excitation transformer 14 and with the external circuit conductors by the angled terminal end 23. Electrical connection between the neutral strap line connector and the printed circuit board is made by means of the connecting pin 21 extending through the circuit board and captured within the lanced aperture 22 as indicated.

Figure 2:
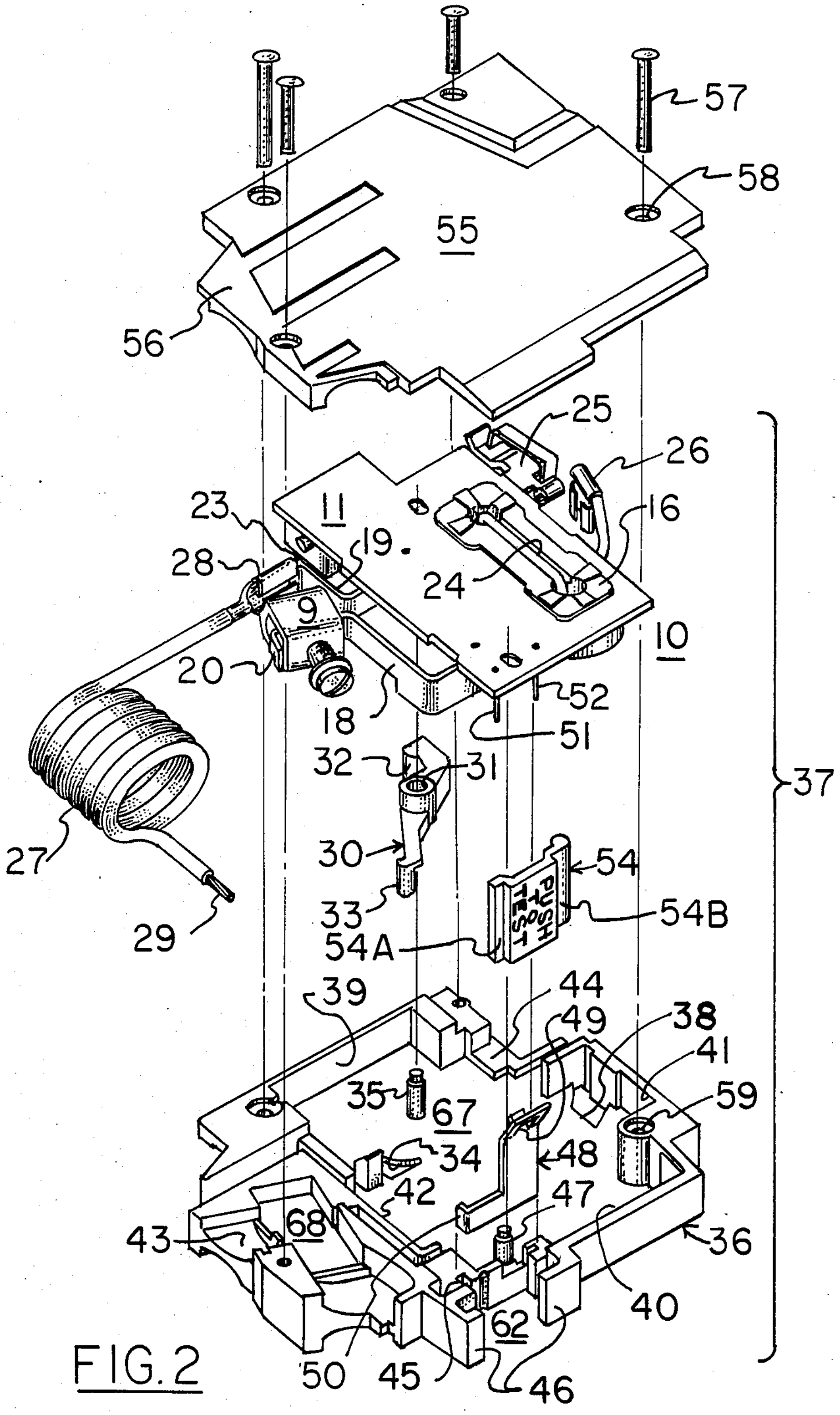
FIG. 2 is a top perspective view of the ground fault module of the invention in isometric projection prior to insertion within the molded case.
Figure 3:
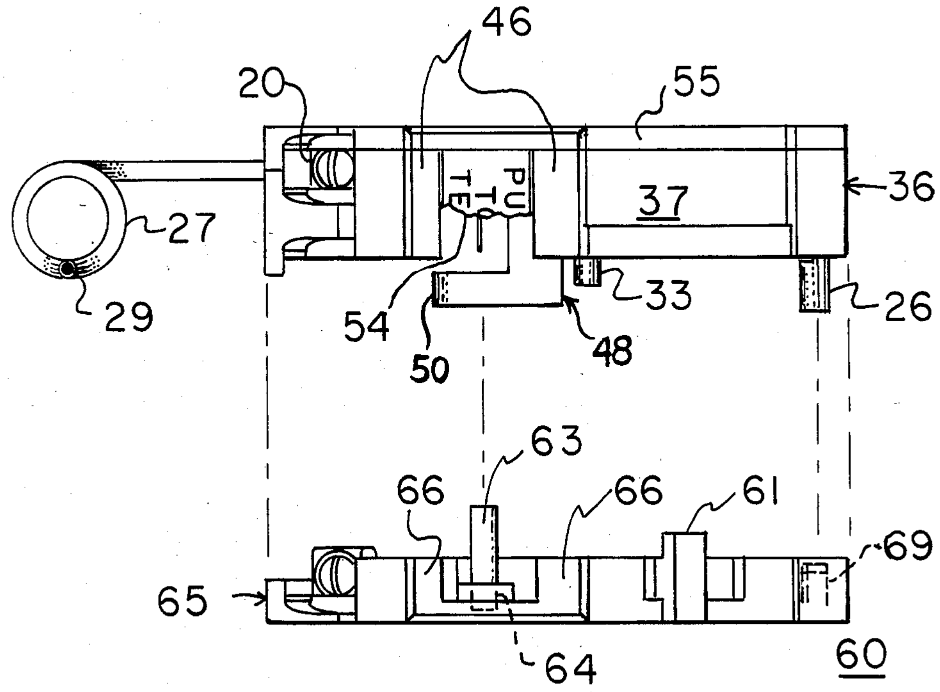
FIG. 3 is a side view of the assembled ground fault module within the case prior to assembly within the circuit breaker module.

The pre-assembled signal processor module 10 is then assembled within the ground fault module case 36 in the manner indicated in FIG. 2 to form one part of the ground fault module 37. The signal processor module 10 is inverted with respect to FIG. 1 prior to insertion and shows more clearly the connecting strap 16 which interconnects the tubular conductors 17 extending within the differential current transformer 15 and neutral excitation transformer 14 shown in FIG. 1. Also depicted is the insulated wire 24 which provides the second electrically conductive path through both of the transformer apertures. Before assembling the signal processor module within the ground fault module case 36, the trip lever 30 is arranged therein by means of the opening 31 through the lever and the pintle post 35 integrally formed within the ground fault case. The lever is arranged to rotate freely about the post such that the arm 32 at one end is impacted by the solenoid plunger 13, shown in FIG. 1, causing the extension 33 at the opposite end to move within the slotted opening 34 through the bottom of the ground fault module case 36. The lever translates the trip initiating motion from the solenoid plunger to the circuit breaker mechanism when the circuit breaker module shown generally at 60 in FIG. 3 is assembled to the opposite side of the ground fault module case 36. A test spring anchor 48 which contains an offset 50 extending from the bottom and a lanced aperture 49 at the top is inserted within a slot 45 formed integrally with the case. The test button 54 is arranged within the test button slot 62 defined by a pair of opposing L-shaped extensions 46 also integrally formed within the case proximate the test spring anchor slot 45 by means of off-set ends 54A, 54B. The test spring anchor offset 50 extends below the ground fault module case 36 and anchors the test spring 63 located within a slot 64 integrally formed within the circuit breaker module case 65 as also shown in FIG. 3. The test spring 63 is located within a complimentary pair of L-shaped extensions 66 formed in the circuit breaker module case 65 which are coextensive with the L-shaped extensions 46 formed within the ground fault module case 36 and receives and supports the test button 54. Both pairs of L-shaped extensions 46, 66 extend from the top of their respective cases 36, 65 in the same plane approximately as far as the circuit breaker module operating handle 61 to allow ease in operating the test button 54. When the signal processor module 10 is positioned within the ground fault module case 36 upon the locating and support post 47 seen by referring back to FIG. 2, a pin contact 51 extending from the bottom of the circuit board 11 is positioned close to but separate from the test spring 63. The pin contact 52 also extending from the bottom of the circuit board is captured within the lanced aperture 49 within the test spring anchor 48. When a push-to-test operation is to be performed, the test button 54 is depressed laterally within the test button slot 62 which forces the test spring 63 into temporary electrical connection with the pin contact 51 against the spring bias created by bending the test spring 63 shown in FIG. 3. Releasing the test button allows the test button to return to its initial rest position under the urgence of the test spring 63. The operation of the test button within the completely assembled ground fault circuit breaker is described in better detail within co-pending U.S. patent application Ser. No. 725,730 entitled "Modular Ground Fault Circuit Breaker" in the names of R.A. Morris et al, which application is incorporated herein for reference purposes.

The ground fault module case 36 further comprises a pair of opposing sidewalls 39, 40 and a pair of opposing endwalls 41 and 42. An opening 44 is provided through endwall 41 to provide electric access to and to support the line stab 25 and an opening 38 is provided through the bottom of the ground fault casing to allow for passage of the flag type spade connector 26. The cavity 43 is integrally formed within the casing to house and support the terminal lug 9, all of which were shown earlier with reference to FIG. 1. When the ground fault module 37 is completely assembled within the ground fault case 36, the cover 55 is placed over the case and secured thereto by means of rivets 57 which extend through the openings 58 in the cover and into the openings 59 formed within the case. The cover has an extension 56 which overlays the cavity 43 and electrically shields the spade connector 28 which is secured to the terminal end 23 of the neutral strap line connector 19. The cover also traps the spade connector between the cover and the bottom 67 of the ground fault module case 36 to prevent removing of the spade connector from the terminal end 23. The terminal lug 9 which is secured to the terminal end 20 of the neutral strap load connector 18 is supported within a separate cavity 68. To facilitate the connection of the ground fault circuitry to the system neutral conductor, a plurality of insulated wire turns 27 terminating in an exposed wire end 29 is assembled at this time as is customary with the packaging of the finished ground fault circuit breaker.

The completed ground fault module 37 is depicted in FIG. 3 with the cover 55 attached to the case 36 such that the terminal end 20 is exposed for electrical access and the wire turns 27 and exposed wire end 29 are readily accessible. As discussed earlier, the test button 54 extends below the ground fault module case 36 to within the circuit breaker module 60 which houses the circuit breaker mechanism. The extension 33 on the trip lever projects down within the circuit breaker module for interaction with the circuit breaker trip mechanism and the flag type spade connector 26 extends within the circuit breaker module and plugs onto the circuit breaker line terminal connection 69 to provide electrical interconnection between the ground fault module 37 and the circuit breaker module 60. The provision of the flag type spade connector 26, which differs from the straight spade connector 28 connected to the terminal end 23 of the neutral strap line connector 19, enables the connector to fit within the close confines of the ground fault module enclosure and facilitates the important down-loading assembly feature of the invention.

It has thus been shown that a ground fault circuit breaker subassembly consisting of the signal processor module and mechanical means for interacting with the circuit breaker operating mechanism as well as electrical means for interconnecting between the signal processor module and the circuit breaker terminals can be readily assembled within a ground fault module. The use of a single wire along with commerically available mechanically crimped plug-in electrical connectors greatly simplifies the assembly process and virtually eliminates the use of welds or soldered joints. This arrangement allows the components therein to be completely calibrated and tested before being connected to the ground fault module to complete the ground fault circuit breaker assembly. Although the ground fault module of the invention is described as being connected first with the signal processor module and then to the circuit breaker module, this is by way of example only. The circuit breaker module and ground fault modules could be preassembled prior to insertion of the signal processor module, if so desired.

Having described our invention, what we claim as new and desire to secure by Letters Patent is:

1. A ground fault module for a ground fault circuit breaker comprising:

a signal processor means pre-assembled within a first casing for sensing ground fault current in a protected circuit and providing a trip initiating impulse for articulating a circuit breaker operating mechanism pre-assembled within a second casing to interrupt said ground fault current;

trip lever means rotatably mounted within said first casing proximate a trip solenoid on said signal processor means for translating said trip initiating impulse from said trip solenoid to said circuit breaker operating mechanism:

at least one pin contact extending from a bottom of said signal processor means for providing a push-to-test signal to said signal processor means; and a test spring pre-assembled within said second casing proximate a test button extending within said first and second casings, whereby depressing said test button moves said test spring into temporary electric contact with said pin contact.

2. The ground fault module of claim 1 further including a pair of opposing L-shaped extensions integrally formed within said casing and defining a slot, said test button being supported within said slot.

3. The ground fault module of claim 1 including a test spring anchor having a lanced aperture through a top end opposite a bottom offset for capturing another pin extending from said signal processor bottom contact and providing electrical connection with said signal processor means.

4. The ground fault module of claim 2 wherein said test button is slidably arranged within said slot by means of a pair of offset ends.

5. The ground fault module of claim 1 wherein said trip lever comprises a pair of arms, pivotally arranged on an upright support post integrally formed within said casing.

6. The ground fault module of claim 5 wherein one of said trip lever arms includes an extension passing through a slotted opening formed within said casing.

7. The ground fault module of claim 1 further including a spade connector attached to an insulated wire on said signal processor means whereby a cover secured to said casing traps said spade connector therebetween said cover and said casing to prevent removal of said spade connector from said signal processor terminal.

8. The ground fault module of claim 1 including a spade connector connected with said signal processor means and extending from a bottom of said casing for electrical connection with an electric terminal within said separate casing.

9. The ground fault module of claim 1 wherein said test spring is arranged within said separate casing behind said test button for providing spring bias to said test button for returning said test button to an initial undepressed position.

10. A method of assembling a ground fault circuit breaker module comprising the steps of;

providing a molded casing having a bottom surface supporting a pair of opposing end walls and a pair of opposing sidewalls, said sidewalls having electric access slot means formed therein;

arranging a rotatable trip lever on a post integrally formed within said casing and aligning an extension formed on said trip lever through an opening formed in a bottom of said casing;

inserting a test spring anchor and a test spring through a slot formed within one of said end walls;

inserting a test button through a slot formed with said one end wall; and arranging a signal processor module containing a trip solenoid within said casing, whereby one of a pair of pin contacts extending down from a bottom of said signal processor proximate said test spring provides temporary electric connection with said signal processor module.

11. The method of claim 10 including the step of capturing the other of said pin contacts Lithin a lanced aperture formed within said test spring anchor to electrically connect said signal processor with said test spring anchor.

12. The method of claim 10 including the step of extending a bottom part of said test spring anchor through said molded casing bottom surface for capturing said test spring within a separate circuit breaker casing.

13. The method of claim 12 including the step of extending a spade connector through said molded casing bottom surface for electrical connection between said signal processor module and an electrical terminal on said separate circuit breaker casing.

14. The method of claim 13 including the step of further inserting said test button within a slot formed within said separate circuit breaker casing.

* * * * *